Sept. 17, 1957  R. GENNERMANN  2,806,549
WASHING APPARATUS FOR AIR FILTERS OF THE CIRCULATING BELT TYPE
Filed May 20, 1955
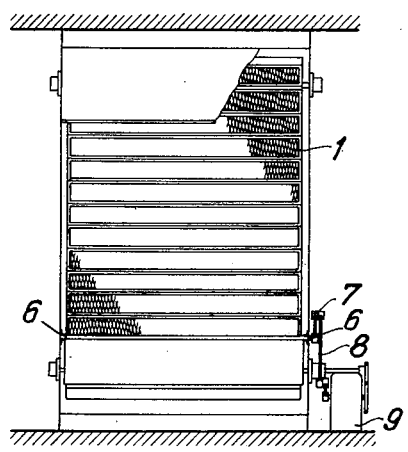
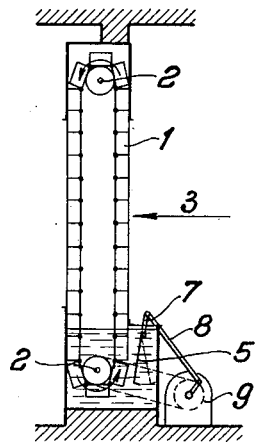
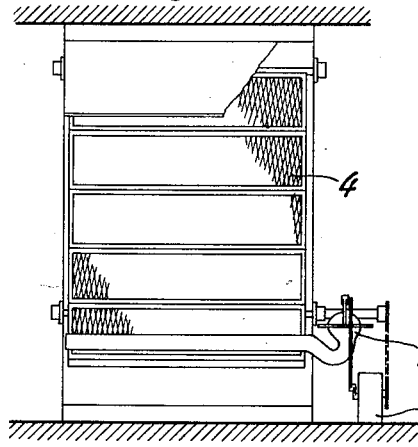
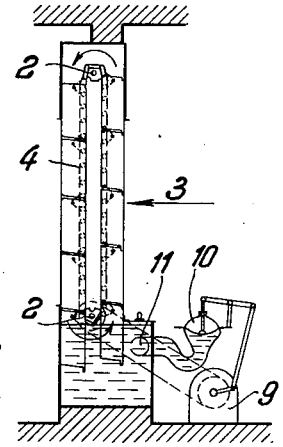

2,806,549
WASHING APPARATUS FOR AIR FILTERS OF THE CIRCULATING BELT TYPE

Robert Gennermann, Berlin-Britz, Germany, assignor to Delbag-Luftfilter G. m. b. H., Dusseldorf-Heerdt, Germany, a limited liability company of Germany Application May 20, 1955, Serial No. 509,995
In Germany December 1, 1948
Public Law 619, August 23, 1954
Patent expires December 1, 1968

1 Claim. (Cl. 183—52)

The present invention relates to a washing apparatus for an air filter, and more particularly for an air filter of the type including a circulating belt immersing into the washing liquid to be wetted thereby.

It is the object of the invention to provide means whereby the filter web or belt will be cleaned in an improved manner.

Further objects of the present invention will appear from a detailed description of two preferred embodiments of the invention following hereinafter with reference to the drawings. It is to be understood, however, that such detailed description serves the purpose of illustrating the invention rather than that of limiting or restricting the same. In the drawings, Fig. 1 is an elevation of an air filter of the circulating belt type, the casing being partly removed to expose the filter web to view, Fig. 2 is a side view of Fig. 1, the housing being partly shown in section, Fig. 3 is a view similar to that of Fig. 1 of a modified embodiment of the present invention, and Fig. 4 is a side view of Fig. 3 partly shown in section.

The air filter illustrated in Figs. 1 and 2 operates on the known circulating belt principle. It comprises an endless belt or web 1 composed of filter elements which are pivotally connected to each other, such web or belt being guided by upper and lower rollers 2, one or both of which are driven by a suitable motor not shown to thereby circulate the filter in the direction indicated by the arrows. The lower portion of the filter belt immerses into and is wetted by a liquid contained in a reservoir. Preferably, a suitable oil is used for that purpose. After the filter belt has left the wetting liquid it is traversed by the dust-laden air as indicated by the arrow 3, the dust contained in the air being bound by the wetting medium. In lieu of linked filter cells 4 carried by endless chains running over sprockets, an endless filter web may be employed. After the filter belt has been charged with the dust removed from the air it is returned to the wetting liquid. It is desirable that the dust be removed from the filter belt during the movement of the latter through the wetting liquid and be caused to drop to the bottom. Experience has shown that this object is rarely attained with prior filter apparatus of this kind. Most kinds of dusts will adhere to the filter belt so tenaciously that the simple passage of the filter through the wetting liquid does not cause the belt to be cleaned. The majority of the dust will adhere to the belt and will be carried by the same out of the wetting liquid and into the stream of dust-laden air where the filter belt is additionally enriched with dust. This process is repeated at any revolution of the filter belt whereby gradually the filter belt will be completely clogged with dust.

It is the purpose of the present invention to remedy this disadvantage. The invention is based on the fact that the filter belt will be cleaned from the adhering dust if a liquid is pressed therethrough. For this purpose, the wetting liquid itself may be employed.

In the embodiment illustrated in Fig. 1 the wetting liquid is pressed through the filter belt by a swingable plane plate 5. For the purpose of the swinging of this plate the upper end of the same is pivotally mounted by means of two pivots 6, one of the pivots being provided with an arm 7 linked to a swingable rod 8. Swinging motion is imparted to the rod 8 by a driving unit 9. The motor of the driving unit may be the same motor which imparts movement to the rollers or sprockets 2 and thus to the filter belt.

By movement of the plane plate 5 in the direction towards the filter belt the wetting liquid is pressed through the filter belt. On return of the plane plate away from the filter belt, the wetting liquid is sucked through the belt. This continual pressing and sucking of wetting liquid through the filter belt causes the same to be thoroughly cleaned so that the filter belt, when leaving the wetting liquid, is exposed to the dust-laden current in a completely cleaned condition in which it is capable of accepting the dust.

The process described is in no way limited to the provision of a swinging plane plate, but may be carried out equally well by the means illustrated in Figs. 3 and 4 in which a tube 11 is so mounted as to extend in front of the filter belt, such tube being provided with a longitudinal slot disposed in opposed relationship to the filter belt. A pump 10 alternatively presses and sucks a stream of liquid out of and into the tube 11 through the longitudinal slot of the same thereby causing the wetting liquid to be pressed and sucked through the filter belt.

As shown in Fig. 4, the pump 10 comprises a container subdivided by a diaphragm into an upper compartment communicating with the atmosphere and a lower compartment communicating with the tube 11 and filled with the wetting liquid. The diaphragm is connected by a link to one arm of a two-armed rocking lever which is mounted for oscillation on the housing of the pump, the other arm being connected by a connecting rod to a revolving crank operated by the motor 9, the motor 9 being also operative to drive the filter belt through a pair of sprockets and a chain.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claim.

What I claim is:

Washing apparatus for an air filter of the circulating belt type comprising a reservoir containing a wetting liquid, a filter belt, means for circulating said filter belt into and out of said reservoir, a swingable member mounted in contact with said liquid and spaced from said filter belt, driving means for swinging said member to thereby impart a reciprocatory motion to said liquid, means causing said reciprocating liquid to pass through said filter belt whereby the wetting liquid will be alternately sucked and pressed through said filter belt, said swingable member being formed by a substantially upright plate and said means causing said reciprocating liquid to pass through said filter belt being constituted by means pivotally mounting said plate in said reservoir in adjacent opposed relationship to an upright portion of said filter belt.

References Cited in the file of this patent
UNITED STATES PATENTS

| | | |
|---|---|---|
| 2,070,872 | Strindberg | Feb. 16, 1937 |
| 2,178,701 | Petre | Nov. 7, 1939 |

FOREIGN PATENTS

| | | |
|---|---|---|
| 25,270 | Germany | Jan. 12, 1884 |
| 389,445 | Great Britain | July 8, 1931 |